Feb. 7, 1933.　　　T. G. MOULDING　　　1,896,640
AIR CLEANER
Filed Sept. 20, 1930　　2 Sheets-Sheet 1
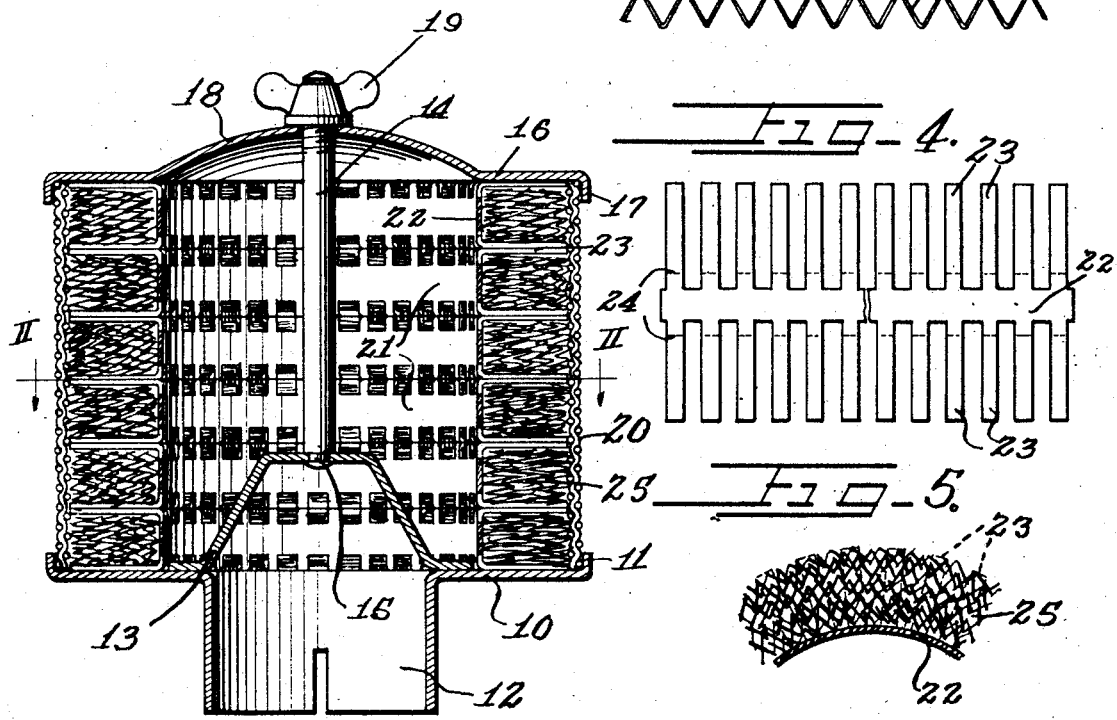
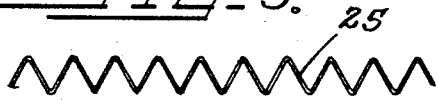
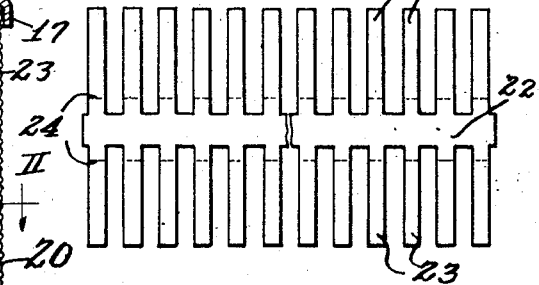
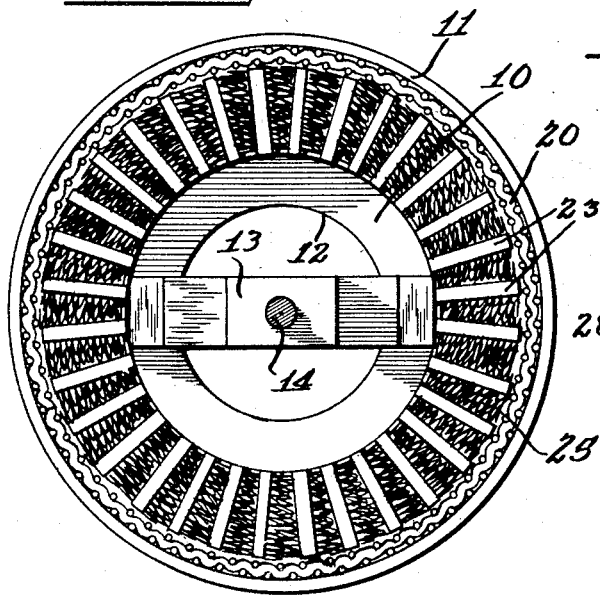
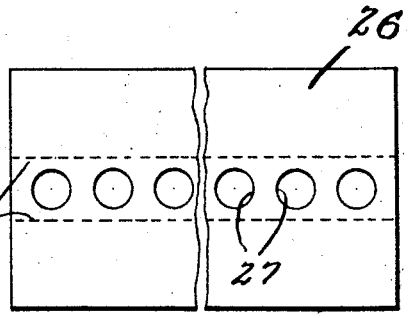
Inventor
Thomas G. Moulding.

Feb. 7, 1933.   T. G. MOULDING   1,896,640
AIR CLEANER
Filed Sept. 20, 1930   2 Sheets-Sheet 2
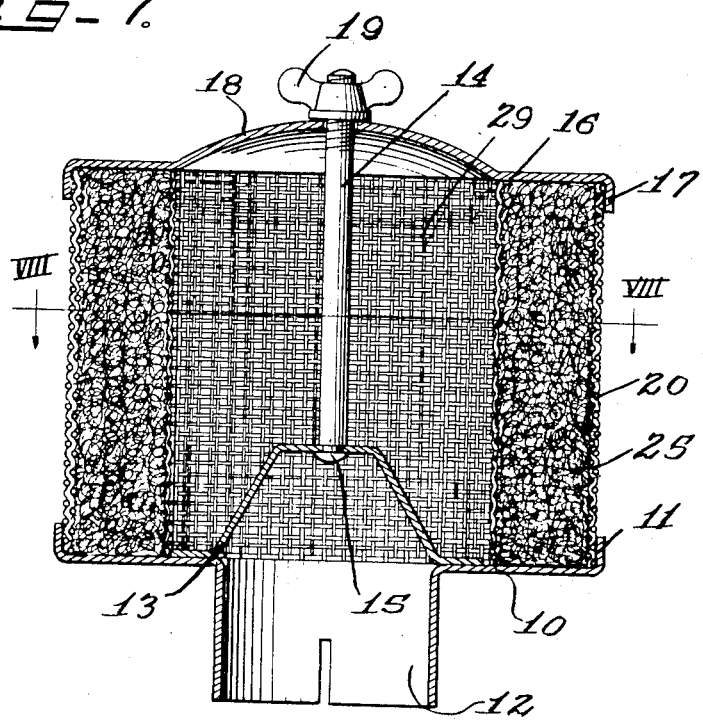
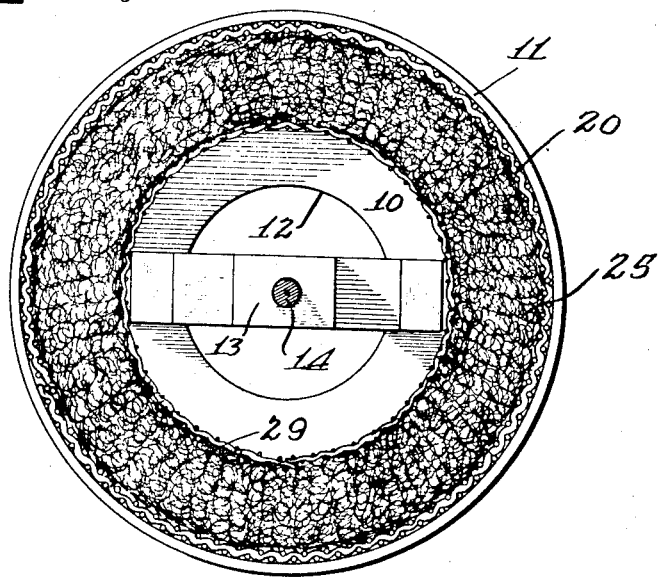
Inventor
Thomas G. Moulding.

Patented Feb. 7, 1933

1,896,640

UNITED STATES PATENT OFFICE

THOMAS G. MOULDING, OF CHICAGO, ILLINOIS, ASSIGNOR TO UNITED AIR CLEANER CORPORATION, OF CHICAGO, ILLINOIS, A CORPORATION OF ILLINOIS

AIR CLEANER

Application filed September 20, 1930. Serial No. 483,201.

This invention relates to improvements in air cleaners, and more particularly to air cleaners of the filter type wherein the air is passed through a filter mass of sufficient density to remove impurities, foreign particles, dust, grit, and the like from the air, the invention being highly desirable for use in connection with the air intake of carburetors for automotive or internal combustion engines, air compressors, and similar situations, although the device will have many and various uses and purposes as will be apparent to one skilled in the art.

In the past, many and various types of air cleaners have been developed for use in connection with mechanical apparatus, but have, in most instances, proven objectionable, especially with regard to filter type air cleaners, in that the filtering mass would become prematurely clogged, and the cleaning of said mass to render the same sufficiently permeable so that there would be no restrictions in the air intake system, was attended with difficulty. Moreover, these cleaners heretofore known lacked desired flexibility in the manufacture thereof, since cleaners of a certain size had all of their important functioning parts of a certain and particular size, while cleaners of a different size had the same respective parts all of a different size so that if a certain number of various sizes were required, the same number of all individual parts for each size was also necessitated, whereby the cost of manufacture was objectionably great. Furthermore, filter type cleaners of the character heretofore known, in most instances, were objectionably difficult to assemble and dismantle.

The present invention has been designed to overcome the above noted as well as other defects and objections in the provision of a filter type air cleaner which comprises a filter element not only sufficiently compact to remove substantially all foreign particles from the air, minute as well as large, but which also is readily and easily cleanable, and very simple to assemble and dismantle.

The invention also seeks the provision of air cleaners in which the actual filtering element may be used in air cleaners of various sizes and capacities and lengthened and shortened as desired.

Also included among the objects of this invention is that of providing an air cleaner in which the cleaning element may be separated into a plurality of individual pieces and each piece separately cleansed of foreign particles removed from incoming air.

Another object of this invention is to provide an air cleaner in which the filtering element embodies one or a plurality of wire strands preferably wavy or steel wool, hair felt or the like, wound in spool fashion about a perforate center element.

Still a further object of this invention is to provide an air cleaner embodying a filtering element which, while sufficiently compact for the purpose of removing substantially all foreign matter from air passing therethrough, nevertheless is sufficiently solid and coarse in texture to permit the same to be readily and easily cleaned by washing in an oil bath.

While some of the more salient features, characteristics, and advantages of a device embodying the present invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a substantially central vertical sectional view, with parts in elevation, of an air cleaner embodying principles of the present invention.

Figure 2 is a plan sectional view of the structure shown in Figure 1 taken substantially as indicated by line II—II of Figure 1.

Figure 3 is an enlarged fragmentary view illustrating the substance of which the filter element itself is formed.

Figure 4 is an enlarged fragmentary view of a portion of the structure shown in Figure 1, showing the same in the form of a blank prior to the shaping thereof.

Figure 5 is an enlarged fragmentary view, plan sectional in nature, illustrating how the short cylinders incorporated in the structure of Figure 1 are formed.

Figure 6 is a view similar to Figure 4 illustrating the blank of a slightly different construction.

Figure 7 is a vertical sectional view similar to Figure 1 of an air cleaner embodying principles of the present invention, but slightly different in construction from that shown in Figure 1.

Figure 8 is a plan sectional view of the structure shown in Figure 7, taken substantially as indicated by the line VIII—VIII on Figure 7.

As shown on the drawings:

In the illustrated embodiment of this invention shown in Figures 1 to 5 inclusive, there is seen a bottom plate or cap 10 having an annular flange 11 therearound substantially normal to the body of the plate, and provided centrally with an integral conduit 12 establishing an outlet for cleaned air. This outlet conduit 12 is for connection with the air intake of a carburetor, air compressor, or similar apparatus. Welded or otherwise secured to the bottom plate 10 is a yoke 13 to which one end of a bolt 14 is riveted as at 15 or otherwise secured. A top plate 16 is also provided, and includes an annular flange 17 extending substantially normal to the plate and towards the flange 11 on the bottom plate 10. The central portion of the top plate 16 is substantially in the shape of a dome 18 and this plate engages over the bolt 14 through a suitable aperture in the dome. The bolt 14 is threaded for any suitable or desired portion of its length and its outer extremity projecting beyond the top plate 16 is engaged by a wing nut 19 by means of which the two plates may be compressed upon structure later to be described.

Disposed between the top and bottom plates 16 and 10 respectively, just within the flanges 17 and 11, is a reinforcing or protecting screen 20, preferably made of hardware cloth, and stacked within this screen is a plurality of individual filtering elements 21. Each of the elements 21 includes a relatively short cylinder which is outwardly channeled. The short cylinder is made from a blank 22 as seen more clearly in Figure 4, which blank is stamped so as to include a plurality of spaced fingers 23 on each side of a solid central portion. The blank is next stamped at substantially right angles along both of the dotted lines 24, whereby a channel member is formed. This channel member is next formed into the shape of a cylinder, the channel opening outwardly. It will be noted that the lines along which the blank 22 is bent are outward beyond the inner termination of the spaced teeth or tongues 23 so that when the channel cylinder is formed there will be openings between the teeth at the top, bottom, and inner walls of the channel. Each individual chanel cylinder is next wound in spool fashion with one or more strands of a wavy or crinkled wire 25 (Figure 3), there being sufficient revolutions of the wire to form a filter mass of sufficient compactness for removing practically all of the foreign matter carried by air entering the cleaner during the passage of the air through the filtering mass, and this is especially true when the filter mass formed by the wire 25 is soaked in oil. An oil film will cover practically every portion of the wire and thus dirt and impurities carried by incoming air will adhere to this oil coating on the surface of the wire.

After the individual filter units 21 have been formed in the manner above described, they are stacked in proper position within the protecting screen 20, the top plate 16 placed over the bolt 14, and the two plates compressed upon the screen 20 and filter units 21 by means of the thumb nut 19. In this manner, each end of the structure is completely sealed with the exception of the outlet conduit 12 which, of course, communicates with the interior of the cleaner.

The operation of the cleaner above described is exceedingly simple and efficient, and the cleaner requires a negligible amount of attention, it being merely necessary to clean the filter mass at rare intervals when the same becomes more or less clogged due to impurities extracted from incoming air. The cleaner is mounted either vertically, horizontally, or at any desired angle by connecting the outlet conduit 12 with the intake of whatever apparatus the cleaner is to function with.

With most mechanical apparatus with which an air cleaner is utilized, there is an internal suction in the apparatus sufficient to draw air thereinto, and in the present instance this suction is effective through the outlet conduit 12, thereby causing air to be sucked into the cleaner transversely through the screen 20 and the filtering elements disposed inside thereof, the air being thoroughly cleaned in its passage through the filtering element, and the cleaned air passing out through the conduit 12 into the apparatus to which the cleaner is attached.

When it is desired to cleanse the air cleaner of collected impurities, it is simply necessary to disconnect the entire device from the apparatus to which it is connected and by grasping the outlet conduit 12 wash the device in an oil bath. Such procedure not only cleans the device but it also gives it a clean coating of oil over the filtering element.

It will be noted that while the filtering element including all of the individual cylinders 21 is sufficiently compact for the adequate removal of impurities and foreign particles carried by incoming air, yet the texture of the filtering element is sufficiently rigid and coarse to enable such collected impurities to be easily washed out of the element. It will also be noted that the filtering element may be cleaned without removing the same from the apparatus to which it is connected by simply taking off the wing nut 19, removing the top plate 16, and extracting all of the individual filtering units 21, whereby the filtering element may be cleaned in individual sections, if so desired.

In Figure 6, I have shown a slightly different way of forming the individual filtering units 21, and in this instance, a blank 26 is used which is provided with a series of central apertures 27. The blank is folded at substantially right angles along both of the lines 28 and then formed into cylindrical shape to provide a relatively short outwardly channeled cylinder. In this instance, however, the upper and lower walls of the channel cylinder will be solid, all of the apertures being disposed upon the inner wall. When the short cylinder is wound in spool fashion with wavy wire 25 and placed in the air cleaner in the same manner as the individual units 21, the air will be forced to pass through the filter mass formed by the wavy wire into the hollow region in the center of the cleaner through the apertures 27.

Air cleaners of the type above described herein will of necessity have to be made in many various sizes depending upon the individual type of apparatus with which the cleaner is associated. For example, if the cleaner is associated with automobile engines, different size cleaners will be necessary for different size engines. Therefore, it should be noted with regard to the present cleaner that in manufacturing various size cleaners, the only variation in parts necessary is the lengthening and shortening of the bolt 14 and protecting screen 20. All of the other elements may be used in a similar cleaner of any size, and more or less individual filtering units 21 incorporated depending upon the size of cleaner desired.

In Figures 7 and 8, I have disclosed an air cleaner embodying the same principles and operating in substantially the same manner as that shown in Figures 1 to 6 inclusive, but embodying a slightly different construction. In the cleaner shown in Figures 7 and 8, the same bottom and top plates 10 and 16 respectively are used, these plates being secured together by a bolt 14 and wing nut 19 in the manner previously described, and between these plates just inside of the flanges 11 and 17 the same type of protecting screen 20 is mounted. However, in this particular construction, an inner screen cylinder 29, made of screens substantially the same as the outer cylinder 20 but preferably lighter, is disposed centrally of the structure, the two screens 20 and 29 being concentric and in spaced relationship to each other. The inner screen 29 is preferably wound in spool fashion with wavy wire 25 to an extent sufficient to form a filter mass capable of accomplishing the purposes intended, and of sufficient depth to substantially fill the space between the two screens. Of course, if so desired, the wire may be wound on a removable spool or other device into the proper cylindrical shape and the two screens and filter mass inserted separately. The end plates are clamped down upon the two screens 20 and 29 by actuation of the wing nut 19 to substantially seal the ends of the device. This device functions in substantially the same manner as that disclosed in Figures 1 to 6 inclusive.

It should also be noted that herein and in the appended claims where the term "cylinder" or "cylindrical" is used, the same is to be construed to mean any configuration of structure having a hollow central region, for it will be appreciated that the cleaner disclosed and described herein may be made in any desired shape having a circular or polygonal cross section.

It should also be noted that while I have indicated the filtering elements as being formed of wavy or crinkled wire, they may also be formed of steel wool, hair felt, or equivalent material wound in spool fashion.

From the foregoing, it will be apparent that I have provided an air cleaner of the filter type which is extremely simple in construction and efficient in operation. Moreover, the cleaner embodies a filtering element which, while being of sufficient compactness for the purposes intended, yet is sufficiently coarse and rigid in construction to render the same easily cleansed of foreign matter removed from incoming air. It will be also appreciated that the cleaner, while being manufactured in many various sizes, incorporates substantially standard parts so that the important and major elements of the cleaner may be utilized in one size for all the various sizes of cleaners, whereby the manufacturing cost is reduced to a marked extent. It will also be appreciated that the cleaner requires very little attention, is extremely durable, and may be very economically manufactured and installed.

I am aware that many changes may be made, and numerous details of construction may be varied through a wide range without departing from the principles of this invention, and I, therefore, do not purpose limiting the patent granted hereon, otherwise than as necessitated by the prior art.

I claim as my invention:

1. In an air cleaner, an outer protective screen cylinder, individual filter elements stacked inside said cylinder, each of said filter elements comprising a relatively short cylinder having openings therethrough and outwardly channeled and wavy wire wound around said short cylinder in the channel thereof, and means for closing the structure at the ends thereof, said means having an outlet therein for cleaned air.

2. In an air cleaner, a protective screen cylinder, a plurality of individual wavy wire cylinders stacked inside said screen cylinder, and means having an outlet opening for cleaned air covering the ends of the structure.

3. In an air cleaner, a protective screen cylinder, outwardly channeled and relatively short cylinders having openings therethrough and wavy wire wound in the channels thereof stacked inside said screen cylinder, a cap over each end of the structure, one of said caps having a substantially central outlet conduit for cleaned air, and means for tightening said caps upon said screen cylinder and short cylinders, said cleaner being made in any desired length depending upon the number of short cylinders used.

4. In an air cleaner, a protective screen casing, individual filter elements stacked inside said casing, each of said elements comprising a wound mass of filtering material, and stiffening means having a free opening in the central portion thereof for holding the mass of each element, and means blocking said cleaner in such a manner that air can only pass through the filter elements.

In testimony whereof I have hereunto subscribed my name at Chicago, Cook County, Illinois.

THOMAS G. MOULDING.